United States Patent

Groeblacher

[11] Patent Number: 5,484,557
[45] Date of Patent: Jan. 16, 1996

[54] METHOD OF AND APPARATUS FOR THE COOLING OF EXTRUDED PLASTIC PROFILES OR SECTIONS

[75] Inventor: Hans Groeblacher, Feasterville, Pa.

[73] Assignee: Mikron Industries, Kent, Wash.

[21] Appl. No.: 131,714

[22] Filed: Oct. 5, 1993

[51] Int. Cl.⁶ .................................................. B29C 47/90
[52] U.S. Cl. ........................ 264/37; 264/560; 264/568; 264/177.19; 264/209.4; 264/DIG. 78; 425/71; 425/326.1; 425/388
[58] Field of Search ............................... 264/37, 177.19, 264/38, 177.17, 557–562, 568, 209.3, 209.4, DIG. 78; 425/388, 326.1, 71

[56] References Cited

U.S. PATENT DOCUMENTS

| | | | |
|---|---|---|---|
| 3,169,272 | 2/1965 | Maxson | 18/14 |
| 3,513,503 | 5/1970 | Paradis et al. | 425/71 |
| 3,538,210 | 11/1970 | Gatto | 264/209.4 |
| 3,576,929 | 4/1971 | Turner et al. | 425/71 |
| 3,778,205 | 12/1973 | Turner et al. | 425/71 |
| 3,825,641 | 7/1974 | Barnett | 264/89 |
| 3,851,028 | 11/1974 | Beyer | 264/177.19 |
| 3,931,379 | 1/1976 | Cruson et al. | 264/45.5 |
| 4,100,243 | 7/1978 | Wissinger et al. | 264/177.19 |
| 4,120,926 | 10/1978 | Titz | 264/177.19 |
| 4,251,195 | 2/1981 | Suzuki et al. | 425/6 |
| 4,340,340 | 7/1982 | Brown et al. | 425/71 |
| 4,530,650 | 7/1985 | Milani | 425/71 |
| 4,575,326 | 3/1986 | French | 425/71 |
| 4,621,678 | 11/1986 | Hahn et al. | 165/27 |
| 4,740,146 | 4/1988 | Angelbeck | 425/71 |
| 4,750,873 | 6/1988 | Loe et al. | 264/209.4 |
| 4,927,574 | 5/1990 | Herrington | 264/40.6 |
| 5,340,295 | 8/1994 | Preiato et al. | 425/71 |

FOREIGN PATENT DOCUMENTS

| | | | |
|---|---|---|---|
| 2322724 | 5/1977 | France | 264/560 |
| 3301556 | 7/1984 | Germany | 425/71 |
| 3241005 | 8/1984 | Germany | 264/209.4 |

*Primary Examiner*—Jeffery R. Thurlow
*Attorney, Agent, or Firm*—Seed and Berry

[57] ABSTRACT

An isobaric vaporization cooling for extruded thermoplastic profiles is carried out at 25 inches Hg in a tank by spraying water onto the extrusions. The water vapor and any air entering the tank are withdrawn to maintain the pressure constant during the cooling and the condensate from the withdrawn vapor is recycled to the spraying nozzles.

24 Claims, 1 Drawing Sheet

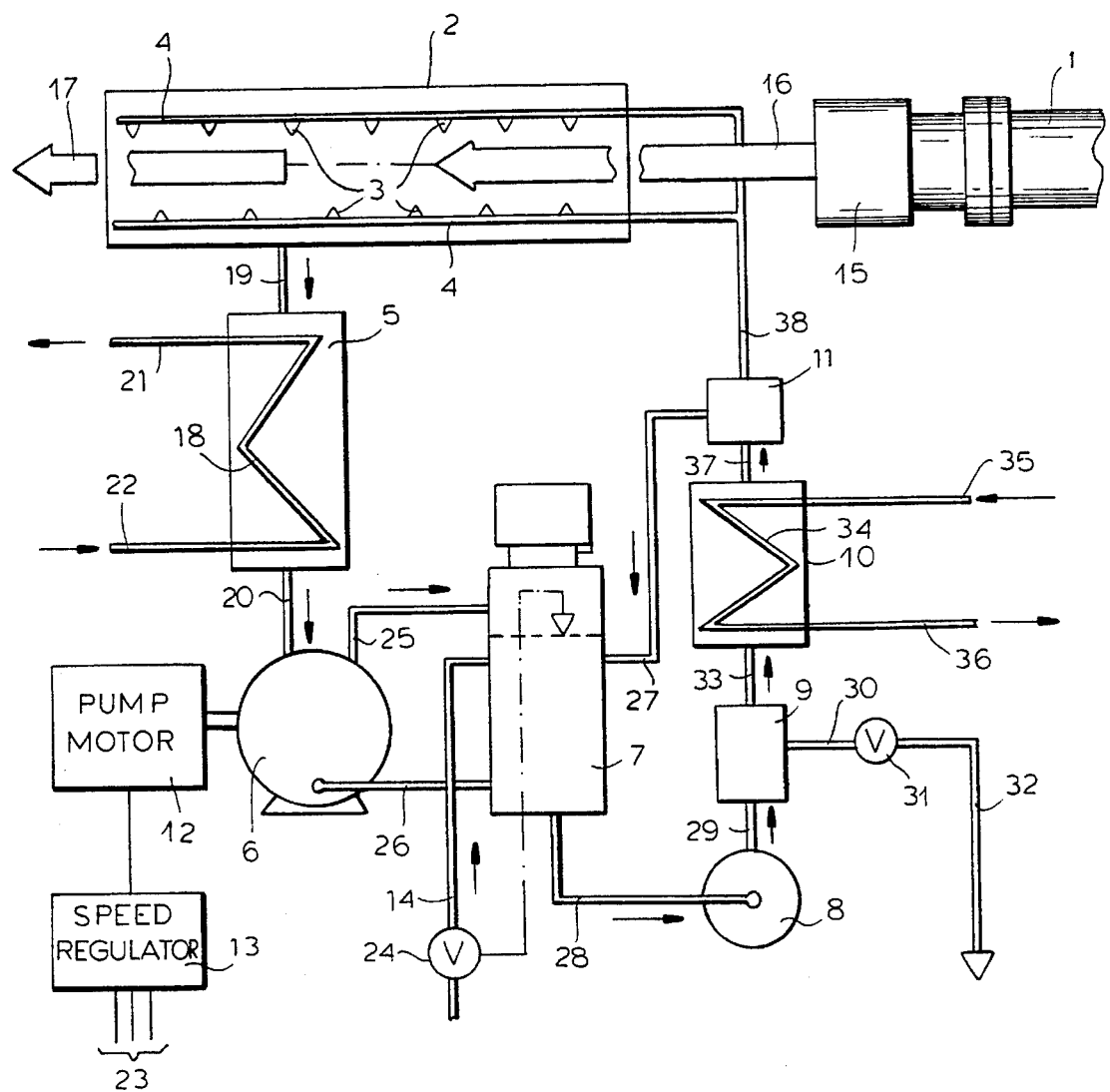

METHOD OF AND APPARATUS FOR THE COOLING OF EXTRUDED PLASTIC PROFILES OR SECTIONS

FIELD OF THE INVENTION

My present invention relates to a method of and to an apparatus for the cooling of hot extruded thermoplastic profiles following their emergence from the extrusion die of an extruder. More particularly this invention relates to an isobaric vaporization cooling process for such profiles.

BACKGROUND OF THE INVENTION

Extrusion process are known for the production of a variety of structural shapes, sections and profiles of thermoplastic materials, such as polyvinylchloride. Among the structural shapes, sections or profiles produced by extrusion are window-forming profiles, window frame members, door frame members, siding and the like.

An extruded material emerges from an extrusion die after having been plastified, masticated and mixed at elevated temperatures in a worm-type extruder with at last one screw and generally at least two screws, at an elevated temperature so that cooling of the extrusion is required.

While air cooling is possible, the amount of heat which can be abstracted from the extrusions by air cooling processes is limited so that significant cooling stretches are required.

Conventional water cooling techniques, whereby water is simply sprayed on the extruded profile have been found to be uneconomical and of low energy efficiency.

OBJECTS OF THE INVENTION

It is, therefore, the principal object of the present invention to provide an improved process for the cooling of a hot extruded profile, preferably from a temperature close to that at which the extruded profile emerges from the extruder or die to ambient temperature, whereby drawbacks of earlier cooling processes are avoided.

Another object of this invention is to provide an improved method of cooling a hot extruded profile which minimizes the utilization of cooling water and thus has high energy and water-utilization efficiency.

It is also an object of the invention to provide a highly economical process for cooling extruded profiles which can be carried out at low capital cost and which is easy and inexpensive to control.

Still another object of my invention is to provide an improved apparatus for the cooling of such profiles, preferably in association with an extruder, which can achieve the advantages of improved method and is also free from drawbacks of earlier cooling systems.

SUMMARY OF THE INVENTION

I have now discovered that the drawbacks of earlier systems for the cooling of hot extruded profiles, especially with respect to energy efficiency and water consumption, can be overcome by an isobaric vaporization cooling process in which the hot extruded profile is cooled by spraying water onto it and vaporizing the water on contact with the hot profile into a subatmospheric pressure which is maintained constant in a vacuum tank in which the extrusion, profile or section is cooled.

More particularly, the method of cooling a hot extruded thermoplastic section according to the invention can comprise the steps of:

(a) enclosing a hot extruded thermoplastic section to be cooled in a vacuum tank;

(b) generating a subatmospheric pressure in the tank;

(c) spraying liquid water into the tank and onto the hot extruded thermoplastic section, thereby evaporating the liquid water to produce water vapor and cool the extruded section at the pressure;

(d) withdrawing water vapor produced in the tank and condensing the withdrawn water vapor to maintain the pressure in the tank during the cooling of the extruded section; and (e) recycling condensed water from step (d) to step (c) as at least part of the liquid water sprayed in step (c) onto the hot extruded thermoplastic section.

Indeed, I have found that by far the best results are obtained when the absolute pressure in the tank is 25 inches of mercury column or 0.13675 atmospheres (absolute) with a resulting vaporization temperature of 50° C.

According to a feature of the invention, the water vapor withdrawn from the tank is condensed by indirect heat exchange with a liquid coolant which can also be water. The condensing of the water vapor in a water vapor or steam condenser connected to the vacuum tank can maintain, at least in part, the subatmospheric pressure in the vacuum tank. Of course, when the tank is open at its inlet and outlet, e.g. for continuous passage of the profile or section through the tank during the cooling process and air must be evacuated to balance the air drawn in through the inlet and/or outlet, a suction pump can additionally be connected to the condenser so that a mixture of air and water vapor is withdrawn from the tank and a mixture of air and liquid water (condensate) is delivered to an air/liquid separator from which the liquid water can be recycled to the sprayers in the tank.

According to a feature of the invention, subatmospheric pressure in the tank is maintained by controlling the temperature of the liquid coolant or the flow rate thereof or both.

The subatmospheric pressure can be initially established in the vacuum tank by at least temporarily connecting a vacuum pump to the latter through the condenser or by temporarily operating that vacuum pump and the subatmospheric pressure can be sustained by the use of that pump. For that purpose, the pump is advantageously a variable-speed pump.

Thus an important step of the method or process can be the step of controlling the speed of the vacuum pump to regulate the pressure at least initially.

According to a further feature of the invention, the liquid water which is recycled, according to the invention, can be filtered, preferably through a self-cleaning or automatically cleaned filter.

The vacuum pump can be continuously operated during cooling of the extruded section at least at a rate sufficient to balance air incursion into the tank with the air being separated from liquid water downstream of the vacuum pump and prior to recycling the water. The air/water separator can also be used as a reservoir for storing the liquid water received from the vacuum pump and prior to recycling. In that case the method can comprise the step of maintaining a substantially constant level of liquid water in the air/liquid separator.

According to another aspect of the invention, an apparatus for producing an extrusion can comprise, in combination, an extruder for producing the hot extruded thermoplastic section and means for cooling that section. The means for cooling can comprise, in turn, a vacuum tank for producing an extrusion, comprising, in combination, an extruder for producing a hot extruded thermoplastic section, and means for cooling the hot extruded thermoplastic section, the means for cooling comprising:

a vacuum tank downstream of the extruder for receiving and enclosing the hot extruded thermoplastic section to be cooled and produced in the extruder;

means for generating a subatmospheric pressure in the tank;

spray means in the tank for spraying liquid water into the tank and onto the hot extruded thermoplastic section, thereby evaporating the liquid water to produce water vapor and cool the extruded section at the pressure;

means for withdrawing water vapor produced in the tank and condensing the withdrawn water vapor to maintain at least in part the pressure in the tank during the cooling of the extruded section; and means for recycling condensed water to the spray means as at least part of the liquid water sprayed onto the hot extruded thermoplastic section.

In this context, the means for withdrawing can include a water-cooled condenser connected to the vacuum tank.

The means for generating can include the vacuum pump connected to the water-cooled condenser for drawing a vacuum in the tank through the condenser. Speed-control means is provided for controlling the motor of the vacuum pump and thus the rate at which a vacuum is drawn in the tank and the condenser. The means for recycling can include:

an air/liquid separator connected to the vacuum pump for separating water condensed in the condenser from air drawn from the tank with water vapor by the vacuum pump;

means for maintaining a constant water level in the separator;

a water pump for feeding water from the separator to the spray means; and a pressure regulator between the water pump and the spray means for controlling a pressure with which water is fed to the spray means.

BRIEF DESCRIPTION OF THE DRAWING

The above and other objects, features and advantages of the invention will become more readily apparent from the following description, reference being made to the sole FIGURE which is a flow diagram illustrating an apparatus according to the present invention.

SPECIFIC DESCRIPTION AND EXAMPLE

In the drawing I have shown an extruder 1 which can be of the American Maplan TS-88 type and which can be provided with an extrusion die 15 for producing, for example, window frame or door frame profiles 16.

The extruded profile of extrusion 16 can be fed to a vacuum tank 2 and, for that purpose, between the extrusion die 15 and the vacuum tank 2, a caterpillar puller of the type American Maplan CP-P-1.2 and a cut-off saw of the type American Maplan SP-16/08/30, can be provided.

The isobaric vaporization cooling vacuum tank 2 is designed to be able to sustain a subatmospheric pressure of 25 inches of mercury and thus 0.13675 atmosphere (absolute). The cooled profile is discharged at 17.

Within the vacuum tank 2, pipes 4 conduct the cooling liquid to spray heads 3 which spray nozzles or the water onto the extrusion 16, the water being vaporized at a temperature of 50° C. at the subatmospheric pressure within the tank.

Water vapor and any air which may enter the vacuum tank 2 through the inlet and outlet sides thereof is drawn through a pipe 19 into a steam condenser 5 provided with a coil 18 for the indirect heat exchange between the water vapor or steam and a cooling water discharge via pipe 21 and supplied via pipe 22. The liquid water and air mixture from the steam condenser 5 is fed by a pipe 20 to a vacuum pump 6.

The liquid water and air mixture can be forced by the vacuum pump 6 via a line 25 into an air/liquid separator 7. The water can be withdrawn from the separator by the vacuum pump 6 via a line 26 and the water level may be maintained constant in the separator 7 by a level control represented here as a valve 24 connected to a water supply line 14 which provides the make-up water as well.

As noted previously, the air/liquid separator 7 serves as a reservoir for the recycled water, and thus liquid water is withdrawn from the separator 7 via a line 28 and fed by a water pump 8 through a line 29 to a filter 9. The filter 9 may be of the self-cleaning type and contaminants can be carried off via a line 30 as controlled by valve 31 to be discharged through line 32.

The recycled water is fed via a line 33 through a heat exchanger 10 provided with a cooling coil 34 having an inlet 35 and an outlet 36 connected respectively to a source of cooling water and to a return therefor.

The recycled water is then fed via a line 37 through a pressure regulator 11 to the line 38 feeding a spray heads 3.

Bypassed water is returned by the pressure regulator 11 through a line 27 to the air/liquid separator 7.

The pump 6 has a pump motor 12 whose speed is controlled by a speed regulator 13 connected to the power supply line 23.

Utilizing this system and initially drawing a vacuum of 25 inches of mercury and maintaining that pressure in the vacuum tank 2 by condensation of water in the steam condenser 5 and by controlled speed operation of the vacuum pump 6, I am able per 1000 pounds per hour of extruded double-hung frame profiles to effect cooling, other things being equal, with 112.5 kilowatts of total connected power compared with 310 kilowatts for conventional spray cooling and a water consumption of 5,380 gallons per hour as compared with 15,600 gallons per hour.

At the same time the cost of equipment can be reduced by almost 70% and the man-power utilization by almost 70%. There is, additionally, a saving of reduced maintenance of the equipment, improvement of the quality of the extruded product because of greater stability of the process, etc.

The extrusion rate of the extruder is 1000 pounds per hour at 200° C. and the temperature of the cooling water at pipe 22 is 7° C. and at pipe 21 is 10° C. Correspondingly the cooling water at inlet 35 is 7° C. and at 36 is 10° C.

The extruded material is rigid polyvinylchloride. The specific heat of the material is 0.9 to 2 J/g°K. The specific heat conductivity is 0.15 to 0.18 W/°Km.

The profile weight was 1276 g/m, the cross section was 876.2 mm$^2$ and the wall thickness was 1.5 mm. The cooled temperature of the profile was 30° C.

I claim:

1. A method of cooling a hot extruded thermoplastic section, comprising the steps of:

(a) enclosing the hot extruded thermoplastic section to be cooled in a vacuum tank;

(b) generating a selected subatmospheric isobaric pressure in said tank at which liquid water sprayed onto the extruded section will vaporize;

(c) spraying a sufficient amount of liquid water into said tank and onto the extruded section to vaporize the liquid water to produce water vapor within said tank and cool the extruded section to a rigid state while within said tank at said selected pressure;

(d) withdrawing from said tank said water vapor produced in said tank and condensing said withdrawn water vapor in sufficient amounts to maintain said selected pressure in said tank during the cooling of the extruded section, thereby producing condensed water; and (e) using said condensed water as at least part of said liquid water sprayed in step (c) onto the extruded section.

2. The method defined in claim 1 wherein said selected pressure is an absolute pressure of substantially 25 inches Hg column and liquid water is vaporized in said tank at a vaporization temperature of substantially 50° C.

3. The method defined in claim 1 wherein said withdrawn water vapor is condensed in step (d) by indirect heat exchange with a liquid coolant.

4. The method defined in claim 3 further comprising the step of selectively adjusting a temperature of said liquid coolant to maintain said selected pressure in said tank.

5. The method defined in claim 3 further comprising the step of selectively adjusting a flow rate of said liquid coolant to maintain said selected pressure in said tank.

6. The method defined in claim 1 wherein said selected pressure is initially generated in step (b) by at least temporarily operating a vacuum pump connected to said tank.

7. The method defined in claim 6, further comprising the step of selectively adjusting a speed of said vacuum pump to maintain said selected pressure in said tank.

8. The method defined in claim 6 wherein a vacuum is drawn by said vacuum pump in said tank through a water-cooled condenser in which condensation of said water vapor is effected in step (d).

9. The method defined in claim 1, further comprising the step of filtering said condensed water in step (e) prior to use thereof in step (c).

10. The method defined in claim 6 wherein said vacuum pump is continuously operated during cooling of the extruded section to withdraw sufficient air to balance air incursion into said tank.

11. The method defined in claim 10, further comprising the step of storing said condensed water received from said vacuum pump in an air/liquid separator prior to use of said condensed water in step (c).

12. The method defined in claim 11, further comprising the step of maintaining a substantially constant level of liquid water in said air/liquid separator.

13. The method defined in claim 10 wherein said withdrawn air is separated from said condensed water after passing through aid vacuum pump but prior to use of said condensed water in step (c).

14. A method of cooling a hot extruded section in a continuous extrusion process, comprising the steps of:

(a) enclosing the hot extruded section to be cooled in a vacuum tank;

(b) generating a selected subatmospheric pressure in said tank at which liquid water sprayed onto the extruded section will vaporize;

(c) spraying a sufficient amount of liquid water into said tank and onto the extruded section to vaporize the liquid water to produce water vapor within said tank and cool the extruded section to a rigid state while within said tank at said selected pressure; and (d) withdrawing from said tank said water vapor produced in said tank in sufficient amounts to maintain said selected pressure in said tank during the cooling of the extruded section.

15. The method defined in claim 14 wherein said extruded section is a thermoplastic and wherein said pressure is an absolute pressure of substantially 25 inches Hg column and liquid water is vaporized in said tank at a vaporization temperature of substantially 50° C.

16. The method defined in claim 14, further including condensing said withdrawn water vapor at a rate sufficient to maintain said selected pressure in said tank.

17. The method defined in claim 16 wherein said withdrawn water vapor is condensed in step (d) by indirect heat exchange with a liquid coolant.

18. The method defined in claim 17 further comprising the step of selectively adjusting a temperature of said liquid coolant to maintain said selected pressure in said tank.

19. The method defined in claim 17 further comprising the step of selectively adjusting a flow rate of said liquid coolant to maintain said selected pressure in said tank.

20. The method defined in claim 14 wherein said selected pressure is initially generated in step (b) by operating a vacuum pump connected to said tank.

21. The method defined in claim 20, further comprising the step of continuously operating said vacuum pump and selectively adjusting a speed of said vacuum pump to maintain said selected pressure in said tank.

22. The method defined in claim 20 wherein a vacuum is drawn by said vacuum pump in said tank through a liquid-cooled condenser which condenses said withdrawn water vapor.

23. The method defined in claim 20 wherein said vacuum pump is continuously operated during cooling of the extruded section to withdraw sufficient air to balance air incursion into said tank.

24. The method defined in claim 14 wherein said selected pressure is at least in part initially generated in said tank by a source of vacuum and said selected pressure is subsequently maintained during cooling of the extruded section at least in part by condensing said withdrawn water vapor to produce a vacuum and applying said produced vacuum to said tank.

* * * * *

UNITED STATES PATENT AND TRADEMARK OFFICE
CERTIFICATE OF CORRECTION

PATENT NO. : 5,484,557
DATED : January 16, 1996
INVENTOR(S) : Hans Groeblacher

It is certified that error appears in the above-indentified patent and that said Letters Patent is hereby corrected as shown below:

In column 5, claim 13, line 58, please delete "aid", and insert therefor--said--.

Signed and Sealed this

Twenty-seventh Day of August, 1996

Attest:

BRUCE LEHMAN

Attesting Officer           Commissioner of Patents and Trademarks